United States Patent

[11] 3,628,142

[72] Inventor George J. Harris
  Middlesex, Mass.
[21] Appl. No. 877,637
[22] Filed Nov. 18, 1969
[45] Patented Dec. 14, 1971
[73] Assignee American Optical Corporation
  Southbridge, Mass.

[54] SLIDING INTERVAL EVENT DETECTOR
  5 Claims, 4 Drawing Figs.
[52] U.S. Cl. .................................................. 324/78 Q,
  324/181
[51] Int. Cl. ...................................................... G01r 23/02,
  G04f 9/00
[50] Field of Search ........................................... 324/78 Q,
  70 C–70 G, 78 D, 68 C, 161; 340/309.1, 263;
  328/141, 136, 138; 307/233, 269, 271

[56] References Cited
UNITED STATES PATENTS
3,289,783  12/1966  Buhler ........................ 246/182 R X
3,284,788  11/1966  Hudson ....................... 324/78 Q UX Primary Examiner—Alfred E. Smith
Attorneys—William C. Nealon, Noble S. Williams, Robert J. Bird and Amster and Rothstein ABSTRACT: A system for detecting the occurrence of a predetermined number of pulses in a predetermined "sliding" test time interval. A plurality of timers is provided each having a timing interval equal to the test time interval. Each input pulse sets one of the timers. To detect N pulses in the test time interval, N−1 timers are required; if a pulse is detected while all of the timers are energized then it is an indication that N pulses have occurred within the test time interval.

Patented Dec. 14, 1971

INVENTOR.
GEORGE J. HARRIS
BY
Amster & Rothstein
ATTORNEYS

SLIDING INTERVAL EVENT DETECTOR

This invention relates to timing systems, and more particularly to a system for detecting the occurrence of a predetermined as of events within a predetermined time interval.

In many situations it is necessary to detect the occurrence of a predetermined number of events within a predetermined time interval. For example, in electrocardiograhic monitoring it is very important for the attending physician to be made aware of frequently occurring ventricular premature beats (VPB's). A typical standard is the occurrence of 5 such VPB's within a 1-minute interval. If at least 5 VPB's occur during any 1-minute interval the physician is alerted via an alarm circuit that the patient requires attention.

Typical frequent-VPB detectors now on the market are relatively crude and medically inadequate. In a typical system, a counter is provided to count the VPB's which occur during a 1-minute interval. At the end of every 1-minute interval, a reset pulse clears the counter and the counter starts over gain. If the number accumulated in the counter just prior to resetting exceeds a predetermined number (for example, 5) an alarm is sounded. The basic shortcoming of this method is that it fails to recognize the case where a number of VPB's occur prior to resetting during the latter part of the counting interval, and more VPB's occur just after the reset pulse. Although in the time interval of one minute a number of VPB's may have occurred which should have caused an alarm to be generated, the system fails to recognize this condition because of the arbitrary split of the critical minute into parts of two distinct counting intervals.

It is a general object of my invention to provide a system which continuously measures the number of events (e.g., VPB's) occurring in a "sliding" time interval of predetermined length, so that no matter what the temporal distribution of the events the occurrence of a predetermined number of events in any time interval of the predetermined length will be detected.

Briefly, in accordance with the principles of my invention, various timers are set into operation by successive events (VPB's in the illustrative embodiments of the invention). Each timer has a period of 1 minute and, in order to detect the occurrence of 5 VPB's in any 1-minute interval, four timers are required. (In general, to detect N events in any arbitrary sliding time interval, N−1 timers are required each having a period equal to the period of interest.) Each VPB sets only one timer, one which is not already set. It is apparent that when all four timers are set, the four VPB's which set them must have all occurred within the last minute. If a fifth VPB is detected while all four times are set, it is an indication that five VPB's have occurred within a 1-minute interval.

It is apparent that with such an arrangement the 1-minute test interval is "sliding"—it does not matter when the VPB's occur in an absolute time framework. All that counts is that the fifth VPB occur within one minute after the first.

The order in which the four timers are set by the incoming VPB's is not important, as long s each VPB results in the setting of only one of the previously reset timers. The scheme for distributing incoming VPB pulses to the various timers, depending on which timers are already set, can vary from system to system. Two illustrative distribution schemes are disclosed hereinbelow.

Further objects, features and advantages of my invention will become apparent upon consideration of the following detailed description in conjunction with the drawing, in which.

Figures 1, 2, 3:
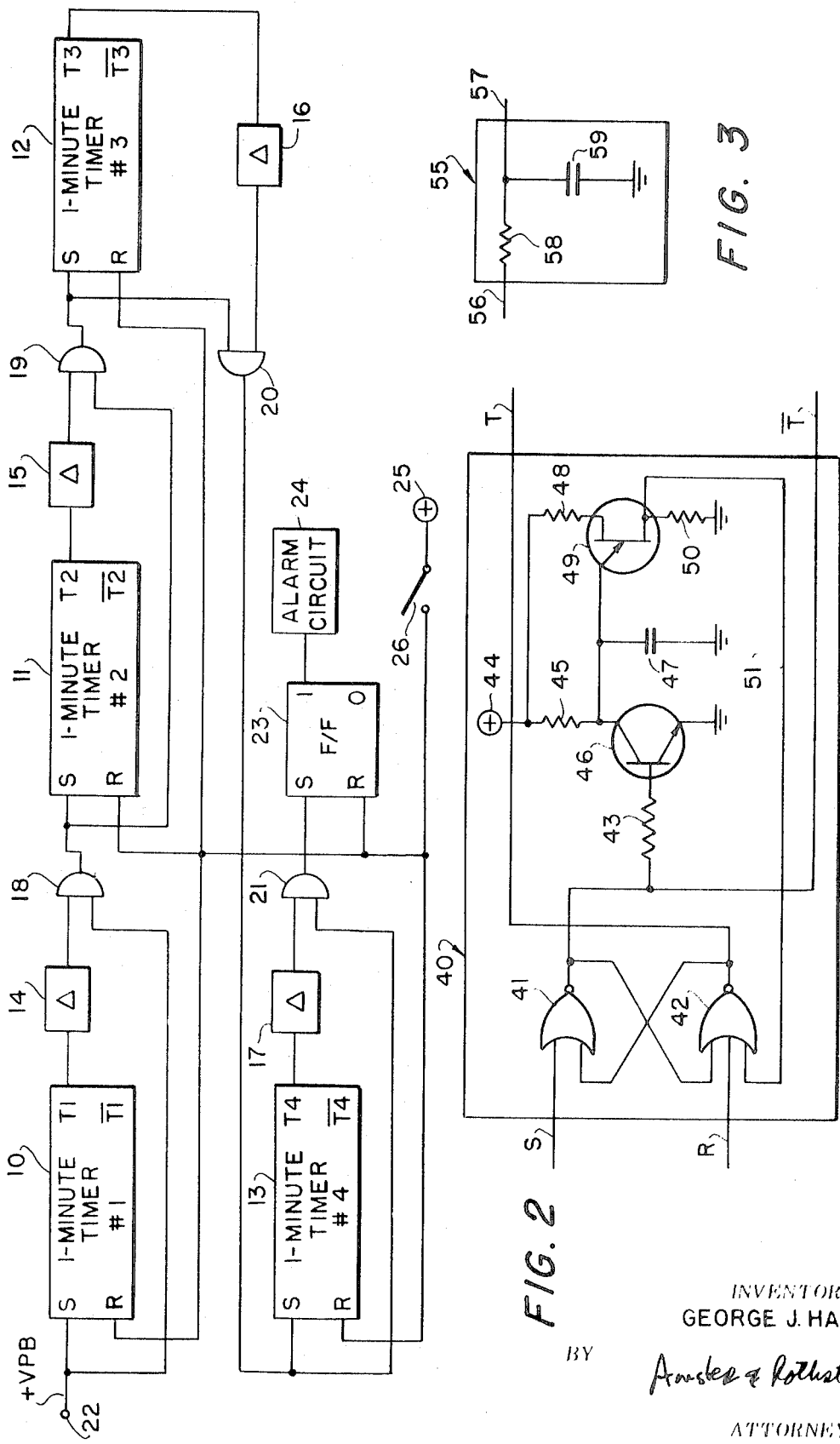
FIG. 1 depicts a first illustrative embodiment of my invention.
FIG. 2 depicts an illustrative circuit 40 which can be used for the timers of the systems depicted in FIGS. 2 and 4.
FIG. 3 depicts a circuit suitable for the delay elements shown in the systems of FIGS. 2 and 4.

Referring to FIG. 1, a positive pulse appears at terminal 22 to indicate the occurrence of the event to be monitored. The pulse appearing at terminal 22 is designated +VPB in FIG. 1 only because the illustrative embodiments of the invention are particularly suitable for use as frequent-VPB alarm circuits.

To reset the system, switch 26 is closed and the positive potential of source 25 is extended to the reset input of each of timers 10–13, and the reset input of flip-flop 23. The T output of each timer goes low, with the $\overline{T}$ output going high. Similarly, the 0 output of flip-flop 23 goes high, with the 1 output going low.

The first pulse at terminal 22, connected to the set input of timer 10, sets the timer with the T1 output going high and the $\overline{T1}$ output going low. For the next minute the timer remains set. Subsequent +VPB pulses applied to the set input of the timer have no effect on the timer operation, until the timer resets after 1 minute at which time the next positive input pulse sets it once again.

The step potential at the T1 output of timer 10 is extended through delay element 14 to one input of AND-gate 18. The other input to the AND gate is connected to terminal 22. AND-gate 18 does not operate with the appearance of the first pulse at terminal 22. The input pulse has a duration measured in microseconds. The delay of element 14 is 1 millisecond. Consequently, the output of delay 14 does not go sufficiently high to energize the associated input of gate 18 until after the input pulse extended to the other gate input has terminated.

If timer 10 is still set when the second pulse appears at terminal 22, the pulse is extended through gate 18 to the set input of the second timer. The T2 output of timer 1 goes high, and the high potential is extended through delay element 15 to one input of AND-gate 19. The second pulse, appearing at the output of gate 18, is also extended directly to the second input of gate 19. HOwever, the pulse at the output of gate 18 has a duration (in microseconds) equal to the duration of the input pulse, and consequently the lower of the two inputs of gate 19 is deenergized before the output of delay element 15 goes high. Consequently, the second pulse sets timer 11 but is not extended through gate 19.

Provided that timers 10 and 11 are still set by the time the third pulse is applied at terminal 22, both of gates 18 and 19 are enabled. The input pulse is extended through gate 18 and then through gate 19 to the set input of timer 12. The third timer turns on with the T3 output going high. The high output is extended through delay element 16 to one input of gate 20. The pulse at the output of gate 19, although coupled directly to one input of gate 20, is not extended through the gate because the pulse terminates before the output of delay element 16 is high enough to enable the gate.

Provided that timers 10, 11 and 12 are all on when the fourth pulse appears at terminal 22, this pulse is extended through gates 18, 19 and 20 to the set input of timer 13. The output of gate 20 is also coupled directly to an input of gate 21, but due to the incorporation of delay element 17 between the T4 output of timer 13 and one of the inputs of gate 21, the fourth input pulse is not extended through gate 21.

Provided all four timers are on when the fifth pulse appears at terminal 22—which can occur only if the first timer has not yet completed its timing interval, i.e., the fifth pulse occurs within 1 minute of the first pulse—the fifth pulse is extended through all of the AND gates to the set input of flip-flop 23. The 1 output of the flip-flop goes high to energize alarm circuit 24 to indicate that 5 VPB's have occurred within a 1-minute interval.

Suppose, however, that all four timers are on after the fourth input pulse is applied at terminal 22, but that timer 10 turns off (after its 1-minute period of operation) before a fifth pulse is received. In such a case, the fifth pulse is not extended through the four AND gates to flip-flop 23 because AND-gate 18 is not enabled by the T1 output of timer 10. Instead, the fifth pulse simply sets timer 10. The pulse terminates before delay element 14 enables gate 18. Consequently, with the appearance of the fifth pulse all four timers are on. The sixth pulse, if it occurs within 1 minute of the second pulse, is extended through all four AND gates to set flip-flop 23.

Similarly, suppose that after the fourth pulse is applied at terminal 22 and all four timers have turned on, more than 1 minute elapses after the appearance of the second pulse. In such a case, both timers 10 and 11 turn off before the fifth pulse is received. The fifth pulse causes timer 10 to turn on, with timer 11 being the only timer which remains off. The sixth pulse is extended through gate 18 to turn on timer 11; all timers are on and the next pulse, if it occurs before timer 12 has turned off, triggers the alarm circuit. It should be noted that in such a case it is timer 12 which is the first timer to turn off since the last two timers to have been set were timers 10 and 11. If timer 12 does turn off, the next pulse is extended through gates 18 and 19 to turn it on.

It is apparent that the pulse distribution scheme of FIG. 1 is such that the timer which is set upon the occurrence of each input pulse is always the least significant timer which is not already on. In other words, timer 10 is always the one which is set by an input pulse, provided it is not already on. If timer 10 is already on, it is timer 11 which is selected if it is not already on. Timer 12 is selected if and only if it is not already on and timers 10 and 11 are on. Finally, timer 13 is set by an incoming pulse only if the three timers occuring earlier in the chain are already on.

The scheme can be extended to detect any number of pulses occurring in any time interval. The number of timers required is one less than the number of events to be monitored, and the timing interval of each timer is the time interval of interest. The chain of timers depicted in FIG. 1 can be considered to be a "series" chain. Each input pulse is extended down a chain of "on" timers to turn on the first reset timer encountered.

It should be noted that in general only N–1 timers are required to count N events in the selected timer period. An Nth timer is not necessary since the Nth pulse need simply trigger the alarm circuit.

FIG. 2 depicts a circuit 40 which can be used for each of the timers 10–13. Cross-coupled NOR-gates 41 and 42 function as a latch. When a positive pulse is applied to the set input of timer 40, it is extended through NOR-gate 41 and the output of the gate goes low. Conductor 51 is initially held at ground potential through resistor 50, and input conductor R is similarly deenergized. With the three inputs of NOR-gate 42 all low, the output goes high to energize the second input of Nor-gate 41. Consequently, even after the pulse at the set input of timer 40 terminates, the output of gate 41 is held low as a result of the high output of gate 42. Similarly, a positive pulse applied to the reset input of the timer causes the output of gate 42 to go low and the output of gate 41 to go high.

Initially, with the output of gate 41 high, a positive potential is extended through resistor 43 to the base of transistor 46. The transistor conducts and current flows from source 44, through resistor 45 and the transistor, to ground. The collector of the transistor is held at ground potential and thus capacitor 47 cannot charge.

However, with the application of a pulse to the set input of the timer, the output of gate 41 goes low. At this time transistor 46 turns off and current flows from source 44, through resistor 45 and capacitor 47, to ground. Unijunction transistor 49 remains off until the voltage across capacitor 47 reaches the firing level. When this firing level is reached, the unijunction transistor turns on, and current flows from source 44, through resistor 48, unijunction transistor 49 and resistor 50, to ground. Similarly, capacitor 47 discharges through the unijunction transistor and resistor 50. The positive potential appearing across resistor 50 is extended along conductor 51 to one input of OR gate 42. This pulse causes the output of gate 42 to go low, resulting in the output of NOR-gate 41 going high. Transistor 46 turns on and capacitor 47 remains shorted to ground until the application of another pulse to the set input of the timer.

Following the application of a pulse to the set input of the timer and the turning off of transistor 46, one minute is required before the voltage across capacitor 47 rises to the firing level of the unijunction transistor. While the capacitor is charging and the timer is on, the output of NOR-gate 42 is high. This output is connected to the T output of the timer which is thus high for as long as the timer is on. Since the T output of the timer is connected to the output of NOR-gate 41, the T̄ output of the timer is low as long as the timer is on. The opposite polarities prevail following the resetting of the timer with the application of a positive pulse to the reset input or the completion of the 1-minute timing interval when a positive pulse appears on conductor 51.

FIG. 3 depicts a delay unit 55 which can be used for any delay units 14–17 in FIG. 1. The input to the delay (from the T output of a timer) is conductor 56, and the output of the delay (extended to the input of an AND gate) is conductor 57. The delay unit itself consists of a resistor 58 and a capacitor 59—a conventional RC integrating network. As is known to those skilled in the art, a positive step on conductor 56 does not result in an immediate positive step on conductor 57. Instead, the potential on conductor 57 grows exponentially. If the time constant of the delay unit is approximately 0.5 milliseconds, the potential of conductor 57 is almost negligible after only a few microseconds have elapsed following the application of a step voltage to conductor 56. Thus when the delay element 55 of FIG. 3 is used in FIG. 1, the input to each AND gate connected to the output of a respective delay unit is not energized by the time the input pulse at terminal 22 (which has a duration in the order of microseconds) has terminated.

Figure 4:
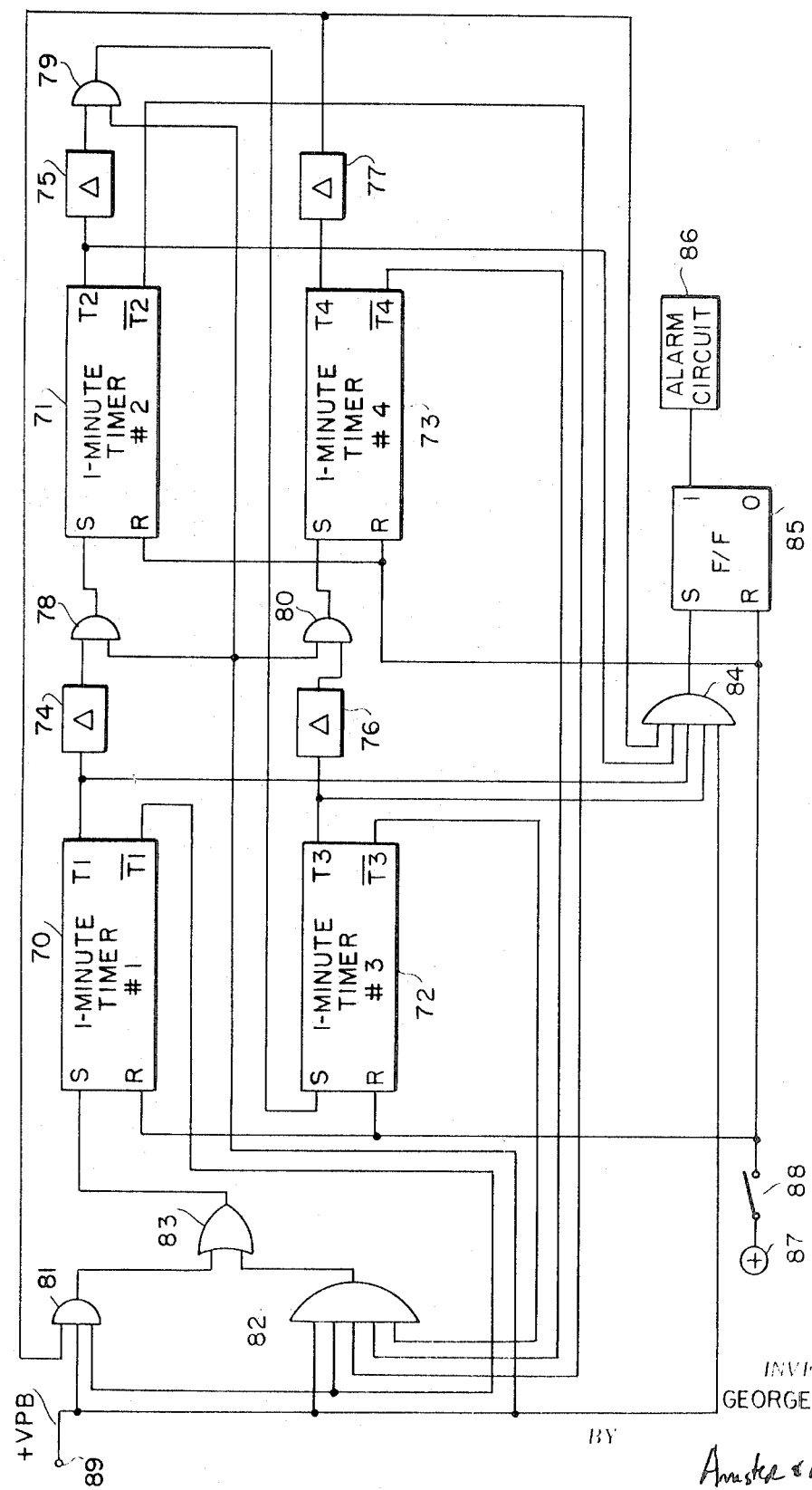
FIG. 4 depicts a second illustrative embodiment of my invention.

FIG. 4 depicts a "parallel" distribution scheme. The T output of each of timers 70–73 is extended to the input of a respective one of delay elements 74–77, and the output of each delay element is extended to an input of a respective one of AND-gates 78–81. This is similar to the arrangement of FIG. 1 except that the chain of FIG. 4 is a closed loop. However, the second input to each AND gate in FIG. 1 is connected to the output of a preceding AND gate in the chain. There is no such arrangement in FIG. 4. Instead, the +VPB pulse on terminal 89 is coupled to an input of each of the four AND-gates 78–81, as well as to inputs of AND-gates 82 and 84. It is this connection of the input terminal in "parallel" to an input of each of the AND gates that gives rise to the characterization of the system of FIG. 4 as a "parallel" scheme.

All of the timers, as well as flip-flop 85, can be reset by source 87 with the operation of switch 88. With ll of the timers reset, gates 78–81, as well as to inputs of AND-gates 82 and 84. It is this connection of the input terminal in "parallel" to an input of each of the AND gates that gives rise to the characterization of the system of FIG. 4 as a "parallel" scheme.

All of the timers, as well as flip-flop 85, can be reset by source 87 with the operation of switch 88. With all of the timers reset, gates 78–81 are disabled since one input of each gate is connected through a delay element to the T output of one of the timers. Similarly, gate 84 is disabled because four of its inputs are connected through delay elements to the deenergized outputs of the timers. However, four of the five inputs to gate 82 are connected to the T1–T4 outputs of the four timers. Consequently, when all four timers are reset, four of the inputs of gate 82 are energized. The fifth input is connected to input terminal 89, and the first input pulse is extended through gate 82, and OR-gate 83, to the set input of timer 70. The timers turns on and energizes one input of gate 78 through delay element 74. Although the input pulse also appears at the second input of gate 78, the pulse is not extended through the gate because the input pulse terminates before the output of delay element 74 goes high.

The second pulse at terminal 89, provided timer 70 is still on, is extended through gate 78 to turn on timer 71. In a similar manner, the third pulse is extended through gate 79 (without first going through gate 78) to turn on timer 72, and the fourth pulse, provided it occurs while timer 72 is still on, is extended directly through gate 80 to turn on timer 73.

It will be recalled that in the system of FIG. 1 the first reset timer in the chain is set by each input pulse. This is not true in the case of the system of FIG. 4. As long as any one of the four timers is set, one of the inputs of gate 82 is deenergized, and the input pulse cannot be extended through gate 82 and OR gate 83 to set timer 70. Instead, the timer which is set is always the first reset timer (in the order 70, 71, 72, 73) which follows an on timer. Suppose that timers 1, 2 and 3 are on and that timer 1 then completes its timing interval before another input pulse occurs. With only timers 2 and 3 on, the next pulse causes timer 4 to turn on. It is apparent that in a system such as that of FIG. 4, no matter how many timers are utilized, all of the on timers will always be in sequence. In this analysis, timer 1 is considered to follow timer 4. In a system such as that of FIG. 1, on the other hand, the on timers need not necessarily be in sequence.

It will be noted that the output of delay unit 77 is extended to one input of gate 81. A second input of this gate is connected to the $\overline{T1}$ output of timer 70. Thus two of the inputs of gate 81 are energized whenever the first timer is off and the fourth timer is on. The third input of gate 81 is connected to terminal 89, and consequently if timer 1 is off when timer 4 is on, timer 1 is the next timer to be set with the appearance of an input pulse.

In effect, the four timers in FIG. 4 are arranged in a closed loop. Gate 81 serves in the same capacity as gates 78, 79 and 80—if timer 4 is the last on timer in the series of on timers, timer 1 will be the next one to be set. Gate 82 is provided in order to select an arbitrary one of the timers (70) to be the starting point in the closed loop. With all timers off, the first input pulse is transmitted through AND-gate 82 and OR-gate 83 to set timer 70.

It is apparent that all four timers will be on simultaneously if four input pulses appear at terminal 89 within a period of one minute. The T1–T4 outputs of the four timers are extended to four of the inputs of gate 84. The fifth input of this gate is connected to input terminal 89. If a fifth pulse is detected within one minute after the detection of the first of the four preceding pulses, flip-flop 85 switches to the 1 state to turn on alarm circuit 86. The enabling of the first four inputs of gate 84 is an indication that 4 pulses have been detected in an interval less than a minute, and the fifth pulse turns the gate on. Instead of providing a fifth timer to monitor the fifth pulse, all that is required is a simple AND gate.

Although the invention has been described with reference to particular embodiments it is to be understood that these embodiments are merely illustrative of the application of the principles of the invention. Numerous modifications may be made therein and other arrangements may be devised without departing from the spirit and scope of the invention.

What is claimed is:

1. A system for detecting the occurrence of a predetermined number of events within a predetermined time interval comprising a plurality of timing means each energizable for said predetermined time interval for representing the occurrence of an event responsive to the initial energization thereof, means for energizing a deenergized one of said timing means responsive to the occurrence of each event, means for representing the simultaneous energizations of all of said timing means, and means for detecting the occurrence of an event while all of said timing means are energized simultaneously.

2. A system for detecting the occurrence of a predetermined number of pulses within a predetermined time interval comprising a plurality of timers arranged in a series chain, each of said timers having a timing period equal to said predetermined time interval and being energizable for said predetermined time interval responsive to the setting thereof by one of said pulses, means for controlling the setting by each of said pulses of only the first deenergized timer in said series chain, and means for representing the simultaneous energizations of all of said timers.

3. A system in accordance with claim 2 further including means for detecting a pulse while all of said timers are energized.

4. A system for detecting the occurrence of a predetermined number of pulses within a predetermined time interval comprising a plurality of timers arranged in a closed loop, each of said timers having a timing period equal to said predetermined time interval and being energizable for said predetermined time interval responsive to the setting thereof by one of said pulses, means for controlling the setting by each of said pulses of only the first deenergized timer in said closed loop following the last energized timer in a selected direction around said loop, means for controlling the setting by one of said pulses of a preselected one of said timers when all of said timers are deenergized and means for representing the simultaneous energizations of all of said timers.

5. A system in accordance with claim 4 further including means for detecting a pulse while all of said timers are energized.

* * * * *